United States Patent
Dreuw et al.

(10) Patent No.: US 10,438,374 B2
(45) Date of Patent: Oct. 8, 2019

(54) METHOD AND DEVICE FOR CALIBRATING A VEHICLE CAMERA OF A VEHICLE

(71) Applicant: Robert Bosch GmbH, Stuttgart (DE)

(72) Inventors: Philippe Dreuw, Heersum (DE); Thomas Focke, Ahrbergen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/949,586

(22) Filed: Apr. 10, 2018

(65) Prior Publication Data

US 2018/0300899 A1     Oct. 18, 2018

(30) Foreign Application Priority Data

Apr. 12, 2017   (DE) .................... 10 2017 206 295

(51) Int. Cl.
| | |
|---|---|
| *G06T 7/80* | (2017.01) |
| *B60R 1/00* | (2006.01) |
| *H04N 5/247* | (2006.01) |
| *H04N 5/232* | (2006.01) |
| *H04N 17/00* | (2006.01) |

(52) U.S. Cl.
CPC .................. *G06T 7/80* (2017.01); *B60R 1/00* (2013.01); *H04N 5/23296* (2013.01); *H04N 5/247* (2013.01); *H04N 17/002* (2013.01); *B60R 2300/402* (2013.01); *G06T 2207/30256* (2013.01)

(58) Field of Classification Search
CPC ... G06T 7/80; G06T 2207/30256; B60R 1/00; H04N 5/232; H04N 5/23296; H04N 5/247; H04N 17/002
See application file for complete search history.

(56) References Cited

U.S. PATENT DOCUMENTS

| | | | | |
|---|---|---|---|---|
| 2009/0179773 | A1* | 7/2009 | Denny | ........................ G06T 7/80 340/901 |
| 2010/0201814 | A1 | 8/2010 | Zhang et al. | |
| 2010/0253784 | A1 | 10/2010 | Konevsky | |
| 2010/0273461 | A1* | 10/2010 | Choi | ....................... G01C 25/00 455/414.1 |
| 2014/0184799 | A1* | 7/2014 | Kussel | .................. G01B 11/272 348/148 |
| 2015/0145965 | A1 | 5/2015 | Livyatan et al. | |

FOREIGN PATENT DOCUMENTS

| | | |
|---|---|---|
| DE | 102008059551 A1 | 6/2010 |
| EP | 0770529 A2 | 5/1997 |
| EP | 2665037 A1 | 11/2013 |
| JP | 2008094375 A | 4/2008 |
| WO | 2012139636 A1 | 10/2012 |

* cited by examiner

*Primary Examiner* — Michael E Teitelbaum
(74) *Attorney, Agent, or Firm* — Norton Rose Fulbright US LLP; Gerard Messina

(57) ABSTRACT

A method for calibrating a vehicle camera of a vehicle includes at least one task of reading in and one task of setting. In the reading in, at least one first camera image and one second camera image are read in, which represent images recorded by at least the vehicle camera during a camera movement of the vehicle camera at a standstill of the vehicle. In the setting, a calibration parameter for calibrating at least the vehicle camera is set, using the first camera image and the second camera image.

9 Claims, 5 Drawing Sheets

US 10,438,374 B2

METHOD AND DEVICE FOR CALIBRATING A VEHICLE CAMERA OF A VEHICLE

RELATED APPLICATION INFORMATION

The present application claims priority to and the benefit of German patent application no. 10 2017 206 295.9, which was filed in Germany on Apr. 12, 2017, the disclosure which is incorporated herein by reference.

FIELD OF THE INVENTION

The approach is directed to a device and/or to a method according to the descriptions herein. The present approach also relates to a computer program.

BACKGROUND INFORMATION

Other motor vehicle video surround view systems, i.e., vehicle surroundings monitoring systems, utilize four or more cameras to detect immediate surroundings of a vehicle. For the intuitive assessment of the situation by a driver in the vehicle, individual images of the camera are combined into an overall view. Due to the fact that the cameras are fixedly installed on the vehicle, usually a static rule about the geometric relationships of the individual images to one another is stored in the vehicle surround view system, VSV system for short; this process is also referred to as extrinsic calibration. This rule is ascertained within the scope of an end-of-line calibration or only from the design data of the vehicle and of the cameras. According to the related art, possibly occurring changes in the calibration are corrected with the aid of a so-called online calibration. Since each individual surround view camera is to be considered a monocamera, and it is thus possible to calculate three-dimensional surroundings models necessary for a calibration only via a camera movement, the correction, i.e., the online calibration, usually takes place by moving the vehicle in the normal driving operation at sporadic time intervals.

Patent document DE 10 2008 259 551 A1, for example, discusses a method for ascertaining a positional change of a camera system with the aid of a first and a second image of a camera.

SUMMARY OF THE INVENTION

Against this background, the approach described here introduces a method for calibrating a camera of a vehicle, furthermore a device which uses this method, and finally a corresponding computer program as described herein. The measures listed in the further descriptions herein allow advantageous refinements of and improvements on the method described herein.

The advantages achievable by the described approach are that a correct calibration of the vehicle cameras is enabled already prior to the vehicle driving off, instead of during a driving operation of a vehicle. This is in particular important since especially when driving off, for example when unparking from a parking space, a correct representation of vehicle surroundings in an overall view of the individual vehicle camera images is necessary for the driver, for example to be able to correctly estimate distances.

A method for calibrating a camera of a vehicle is described. The method includes at least one step of reading in and one step of setting. In the step of reading in, at least one first camera image and one second camera image are read in, which represent images recorded by at least the vehicle camera during a camera movement of the vehicle camera at a standstill of the vehicle. These camera images may be read in, for example, in the form of one or multiple signals read in by an interface to the vehicle camera. In the step of setting, a calibration parameter for calibrating at least the vehicle camera is set, using the first camera image and the second camera image. The vehicle camera may be set with respect to the vehicle and a dedicated camera position.

The method may include a step of determining the camera movement. This may take place, for example, by evaluating a signal of an acceleration sensor or by evaluating the camera images provided by the camera.

This method may be implemented in software or hardware or in a mixed form made up of software and hardware, for example in a control unit.

To render the standstill of the vehicle apparent, the method may include a step of further reading in, in which a vehicle movement signal is read in, which indicates or represents the standstill of the vehicle. A standstill may be understood to mean a speed of the vehicle of essentially 0 km/h. The step of setting may then be carried out in response to the step of reading in and the step of further reading in.

The method described here may advantageously include a step of determining, in which a flux vector is determined using the first camera image and the second camera image, it being possible in the step of setting to set the calibration parameter using the flux vector.

When the method additionally includes a step of receiving, in which a predetermined reference vector is received, and a step of comparing, in which the flux vector is compared to the reference vector, according to one advantageous specific embodiment of the method described here the calibration parameter may be set in the step of setting, using a comparison result of the step of comparing. The reference vector may be a vector which was determined corresponding to the flux vector, however with an empty or unloaded vehicle. Since an immersion depth of the shock absorbers, and thus also a position of the vehicle cameras with respect to the roadway surface, changes when the vehicle is loaded with goods and/or persons, for example, it is possible that an existing extrinsic calibration of the vehicle camera or of the camera system is no longer valid, and thus a re-calibration should be carried out. Whether the existing calibration is valid may advantageously be established by the described step of comparing. Corresponding to the resulting comparison result, the calibration parameter may then be set, for example, when the flux vector does not agree with the reference vector, since such a deviation indicates that the vehicle camera is not correctly calibrated, i.e., is decalibrated.

In the step of determining, the flux vector may be determined, for example, using a road surface spot depicted in the first camera image and the road surface spot depicted in the second camera image. By comparing or superimposing the two camera images, which each depict the same road surface spot, the flux vector is quickly and easily determinable.

In the step of reading in, camera images may be read in which represent images recorded by the vehicle camera situated in the area of an exterior mirror and/or a vehicle door and/or a tailgate of the vehicle. Arrangements of vehicle cameras described here are typical and useful for vehicle surroundings monitoring systems. Since also their camera positions on the vehicle are known, their possible camera movements are also predictable. During an opening of the vehicle door, for example a vehicle camera attached to the vehicle door moves along a defined displacement path. The same applies to a vehicle camera situated on an exterior mirror or on a tailgate. In this way defined vehicle camera movements are possible with a stopped vehicle.

Thus it is advantageous when, in the step of reading in, the camera movement represents a displacement path of at least the vehicle camera caused by folding in and/or folding out an exterior mirror of the vehicle and/or by opening and/or closing a vehicle door and/or by opening and/or closing a tailgate of the vehicle. This is useful since such a displacement path is known from design data of the vehicle, and thus precise knowledge of the plane estimation is also available for the unloaded vehicle.

To ascertain the displacement path representing the camera movement, the method, however, may also include a step of ascertaining, in which the displacement path representing the camera movement is ascertained, using an actuating signal of an adjusting motor for effectuating the camera movement.

Since carrying out a method described here is useful, in particular, when the vehicle is standing up straight, it is advantageous when the method includes a step of further receiving, in which an inclination signal from an interface to an inclination sensor of the vehicle is received, the step of setting not being carried out when the inclination signal indicates an inclination of the vehicle. The inclination may represent a non-horizontal visual range of at least the vehicle camera to the vehicle.

The approach described here furthermore creates a device which is configured to carry out, activate or implement the steps of one variant of a method described here in corresponding units. The object underlying the approach may also be achieved quickly and efficiently by this embodiment variant of the approach in the form of a device.

For this purpose, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded into a communication protocol. The processing unit may be a signal processor, a microcontroller or the like, for example, it being possible for the memory unit to be a Flash memory, an EPROM or a magnetic memory unit. The communication interface may be configured to read in or output data wirelessly and/or in a wire-bound manner, a communication interface which is able to read in or output wire-bound data being able to read these data in, for example electrically or optically, from a corresponding data transmission line or output these into a corresponding data transmission line.

A device may presently be understood to mean an electrical device which processes sensor signals and outputs control and/or data signals as a function thereof. The device may include an interface which may be configured as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, in addition to other software modules.

In one advantageous embodiment, the device sets a calibration parameter for calibrating at least one camera of a vehicle. For this purpose, the device may access sensor signals, for example, which represent at least one first camera image and one second camera image, and optionally also a vehicle movement signal. The activation takes place with the aid of actuators, such as at least one read-in unit for reading in at least the first camera image and the second camera image, and a setting unit for setting the calibration parameter.

In addition, a computer program product or computer program is advantageous, having program code which may be stored on a machine-readable carrier or storage medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the approach described here are shown in the drawings and are described in greater detail in the following description.

DETAILED DESCRIPTION

Figure 1:
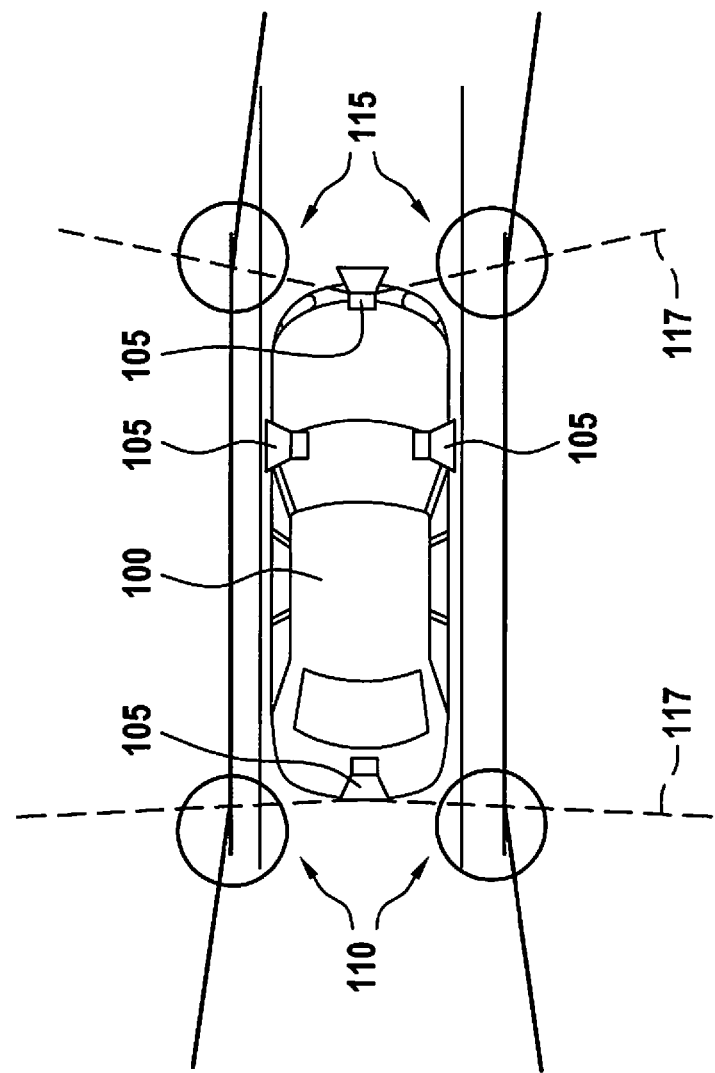
FIG. 1 shows a schematic top view onto a vehicle including a multitude of decalibrated vehicle cameras.

In the following description of favorable exemplary embodiments of the present approach, identical or similar reference numerals are used for similarly acting elements shown in the different figures, and a repeated description of these elements is dispensed with.

FIG. 1 shows a schematic top view onto a vehicle 100 including a multitude of decalibrated vehicle cameras 105.

Vehicle 100 shown here is at a standstill and has been loaded with goods and/or persons, whereby an immersion depth of shock absorbers of vehicle 100, and thus a position of vehicle cameras 105 with respect to the roadway surface has changed compared to a position of vehicle cameras 105 with respect to the roadway surface in an unloaded state of vehicle 100. In this way, an existing extrinsic calibration of the camera system of individual vehicle cameras 105 is no longer valid, and a re-calibration would be necessary. Since vehicle surroundings monitoring systems are usually used in particular for parking assistance, an unparking process after the change in load would take place with an incorrect calibration, and thus also with an unsuitable surround view representation of the vehicle surroundings. The incorrect calibration is shown in FIG. 1 in particular in spots 110, 115 in which individual images of vehicle cameras 105 are combined, or "stitched." As a result, parking lines and curbs do not match during the transition from one image to an adjoining image.

Markings 117 show camera visual ranges of front camera 105 and of rear camera 105 of vehicle 100.

Spots 110 marked in the area of the rear of vehicle 100 show lines which do not extend in parallel to vehicle 100. Lines from a front camera image do not exactly match lines in the side camera image. This deviation was created by vehicle cameras 105 being decalibrated upon loading of vehicle 100.

Spots 115 marked in the area of the front of vehicle 100 show bends in the progression of straight lines. Lines from the front camera image do not exactly match lines in the side camera image. This deviation was created by vehicle cameras 105 being decalibrated due to maladjustment.

Figure 3:
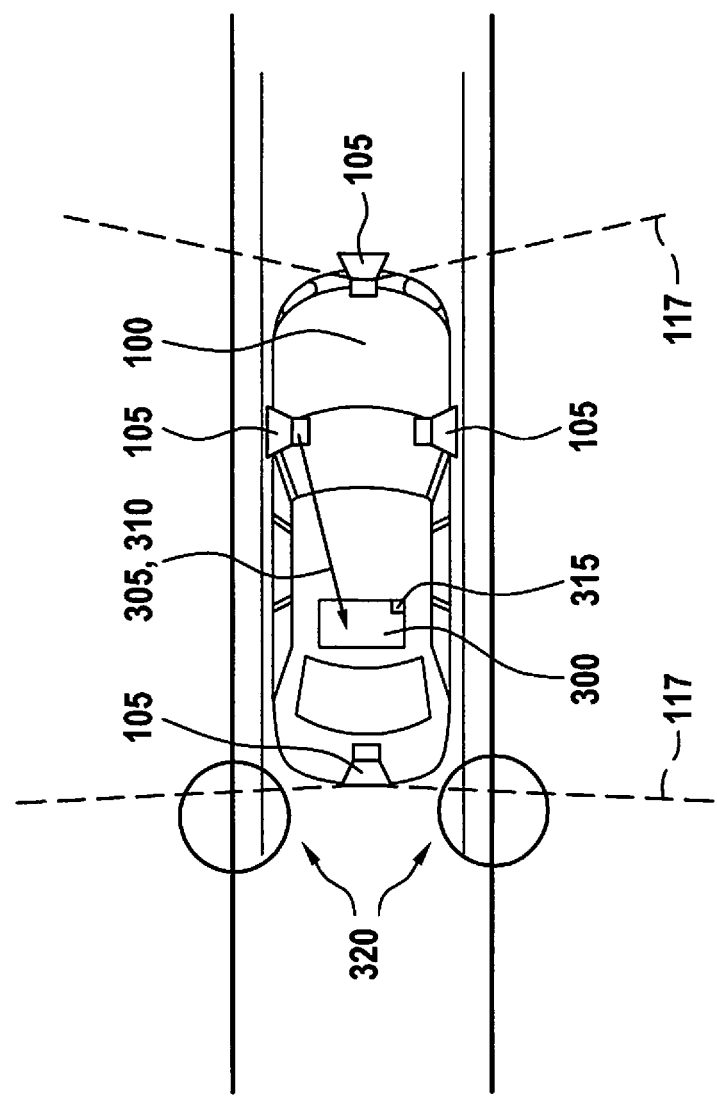
FIG. 3 shows a schematic top view onto a vehicle including a device for calibrating a vehicle camera according to one exemplary embodiment.

As a result of device 105 shown in FIG. 3, a correction of the calibration corresponding to the change in load may advantageously already be carried out at a standstill of vehicle 100, instead of as vehicle 100 is clearly driving, as is the case with known devices. One advantage is that a correct calibration is ensured prior to starting to drive.

Figure 2:
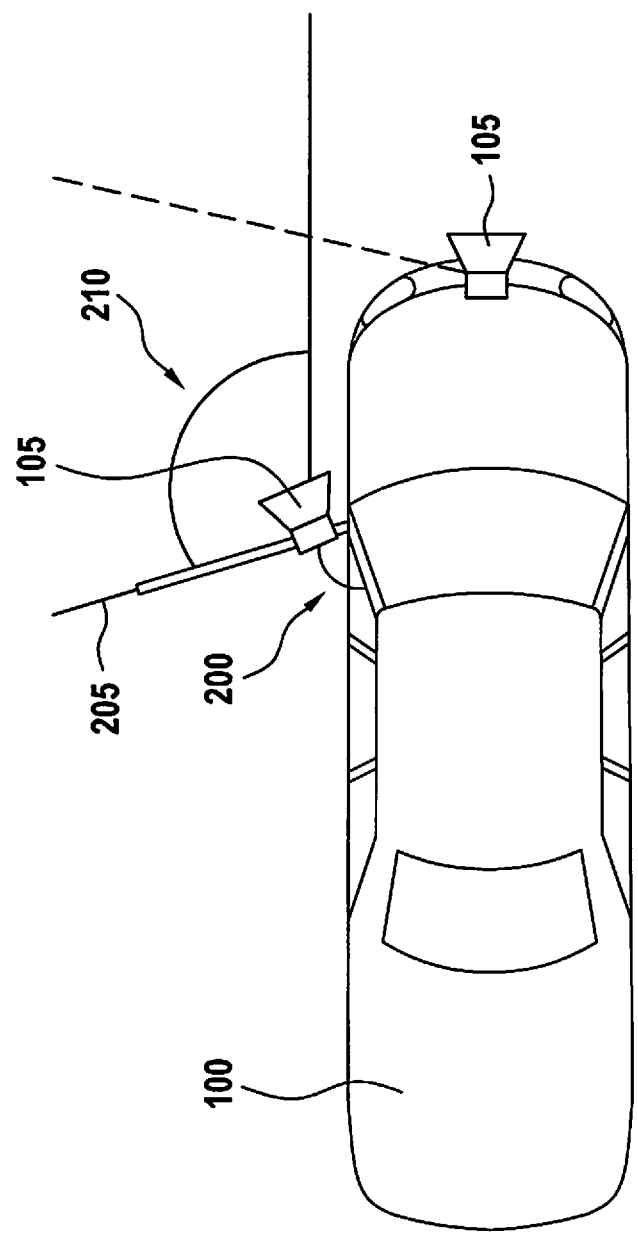
FIG. 2 shows a schematic view of a displacement path of a vehicle camera on a side door of a vehicle.

FIG. 2 shows a schematic view of a displacement path 200 of a vehicle camera 105 on a side door 205 of a vehicle 100. This may be vehicle 100 including vehicle cameras 105 described based on FIG. 1.

As was already addressed in FIG. 1, in known vehicle surroundings monitoring systems, vehicle cameras 105 are initially intrinsically, and then extrinsically, calibrated with respect to one another one time at the factory. While vehicle 100 is driving, later an online calibration of the system, i.e., a correction of the calibration, may take place, which typically assumes a planar surface beneath vehicle 100, and thus is able to compensate for inaccuracies in the installation tolerances of up to approximately 3°. This kind of online calibration has previously only been possible while vehicle 100 is driving, where previously surround view systems were rarely used. However, if a deviation from the calibration already occurs at a standstill due to the vehicle loading, as with vehicle 100 shown here, the accordingly distorted images of vehicle cameras 105, as shown in FIG. 1, no longer coincide, and the end user in vehicle 100 is presented with an accordingly incorrectly transformed overall image of the surroundings on his or her screen. The benefit, in particular during unparking or when driving off slowly, then no longer exists.

An improvement in the situation at a standstill may be achieved in that, according to an approach described here, the calibration is carried out at a standstill based on moved vehicle cameras 105. The movement of vehicle cameras 105 is essentially included since both the doors, here side door 205, and a trunk lid of vehicle 100 are typically already moved prior to starting to drive. As a result of a moving of side door 205 shown here, side door vehicle camera 105 shown here, which is situated on side door 205, carries out displacement path 200, whereby a visual range of side door vehicle camera 105 passes over a yaw angle 210. The movement of a vehicle camera 105 may be identified by evaluating images of the camera or at least one sensor signal, such as of an acceleration sensor, for example.

FIG. 3 shows a schematic top view onto a vehicle 100 including a device 300 for calibrating a vehicle camera 105 according to one exemplary embodiment. This may be loaded vehicle 100 at a standstill described based on the preceding figures, with the difference that vehicle cameras 105 of vehicle 100 were correctly calibrated thanks to device 300 described here.

For this purpose, device 300 of at least one of vehicle cameras 105 has read in at least one first camera image 305 of vehicle camera 105 and one second camera image 310 of vehicle camera 105, camera images 305, 310 representing images recorded during a camera movement of vehicle camera 105 at a standstill of vehicle 100. Using first camera image 305 and second camera image 310, device 300 has set a calibration parameter 315 for calibrating at least vehicle camera 105.

The following features of device 100 are optional:

According to this exemplary embodiment, at least the one vehicle camera 105 was calibrated by set calibration parameter 315.

The camera movement according to this exemplary embodiment is the displacement path of vehicle camera 105 shown in FIG. 2, which vehicle camera 105 carried out by an opening and/or a closing of the side door on which vehicle camera 105 is situated.

According to this exemplary embodiment, device 100 has determined a flux vector, using first camera image 305 and second camera image 310, calibration parameter 315 having been set using the flux vector. The flux vector was determined by device 100 using a road surface spot depicted in first camera image 305 and the road surface spot depicted in second camera image 310. Moreover, device 100 received a predetermined reference vector and compared it to the flux vector, whereupon calibration parameter 315 was set, using a result of this comparison. According to this exemplary embodiment, the displacement path of vehicle camera 105 representing the camera movement was ascertained by device 100, using an actuating signal of an adjusting motor for effectuating the camera movement. Moreover, a vehicle movement signal, which indicates the standstill of vehicle 100, was read in by device 100 before calibration parameter 315 was set.

According to one alternative exemplary embodiment, additionally or alternatively device 100 reads in further camera images, which represent images recorded by at least vehicle camera 105 situated in the area of an exterior mirror and/or of a further vehicle door and/or of a tailgate of vehicle 100, calibration parameter 315 as described above being additionally or alternatively set using the further camera images. In this alternative exemplary embodiment, the camera movement represents a displacement path of at least vehicle camera 105 caused by folding in and/or folding out the exterior mirror of vehicle 100 and/or by opening and/or closing the further vehicle door and/or by opening and/or closing the tailgate of vehicle 100.

Details of device 100 are described again hereafter in different words:

FIG. 3 shows calibrated vehicle cameras 105 after a correction carried out by device 100 described here. Spots 320 show lines which now extend in parallel to vehicle 100. A seamless transition between lines from a rear camera image and lines in the side camera image is apparent here.

Device 100 described here is configured to utilize the movement of foldable side mirrors for the calculation of the calibration. A central issue here is the fact that the displacement path of the mirrors, doors, and optionally also of the tailgate, is known from design data, and thus precise knowledge of the plane estimation is available for unloaded vehicle 100. As an alternative to the movement of the tailgate, a movement of a vehicle camera may also be utilized, which automatically folds out or drops down when a reverse gear is engaged. This defined movement may also be used analogously for folding the side mirrors. Any deviation from this plane estimation is then identified as an error of the calibration and is accordingly corrected. The calibration of the front camera may be inferred from the data of the side and rear cameras, assuming that vehicle 100 is to be regarded as a "rigid system."

Device 100 described here is thus configured to additionally utilize the known movement of folding side mirrors, into which typically the side cameras of a vehicle surroundings monitoring system are integrated. Having knowledge of a circular path traveled by vehicle cameras 105 in the mirrors, this circular path having previously been referred to as the displacement path, advantageously enables the online calibration at a standstill—a comparison between resulting actual circular paths based on corresponding video sequences and setpoint circular paths based on corresponding design drawings and swivel joints of the mirrors allows the calibration to be derived.

The calibration carried out thanks to device 100 prior to starting to drive thus provides a geometrically correct representation of the surroundings of vehicle 100, and thus represents an improvement over known devices.

A function of device 100 may be described as follows, using different words: A vehicle surroundings monitoring system, VSV (video surround view) system for short, shall be assumed. On every individual vehicle camera 105, which moves as a result of a door opening or the mirrors folding in, this inherent movement of vehicle camera 105 allows a plane estimation to be carried out via an optical flux on the textured roadway surface. A direction of the flux vectors on the plane is characteristic with a known displacement path of vehicle camera 105, and in this case corresponds to the plane estimation. A comparison of the calibrated version of the flux vectors, previously referred to as reference vectors, which according to this exemplary embodiment is stored in a memory, to the presently ascertained flux vectors shows a deviation during decalibration. This deviation may be geometrically determined in all three solid angles and be algorithmically corrected. This takes place independently for rear and side cameras by device 100. From the three camera corrections, the position of vehicle 100 to the plane is inferred, and proceeding therefrom the correction of the front camera is also carried out. As an alternative to the plane estimation stored in the memory, it is also possible to measure/ascertain the displacement path of the door/the mirror/the tailgate via the installed adjusting motor, and thus to calculate a setpoint plane estimation in every image. The respective present plane estimation from the image data per image may then be compared thereto, and the correction may be calculated. Via the multitude of images and the two displacement paths, folding in and folding out, a sufficient robustness of the plane estimation is achieved.

Since a method proposed by this device 100 only functions correctly when a visual range illuminated by vehicle camera 105 is horizontal to vehicle 100, device 100 is furthermore configured to receive an inclination signal from an interface to an inclination sensor of vehicle 100. Calibration parameter 315 is not set hereafter when the received inclination signal indicates an inclination of vehicle 100. In this way, it is possible to detect via customarily installed inclination sensors when vehicle 100 stands with at least one wheel on an inclined surface. In this case, the calibration is simply discarded. A plausibility check via inclination sensors also fails when vehicle 100 stands directly next to an inclined plane, e.g., a levee. In this case, the old calibration is resorted to. This presupposes an identification of the faulty calibration.

Figure 4:
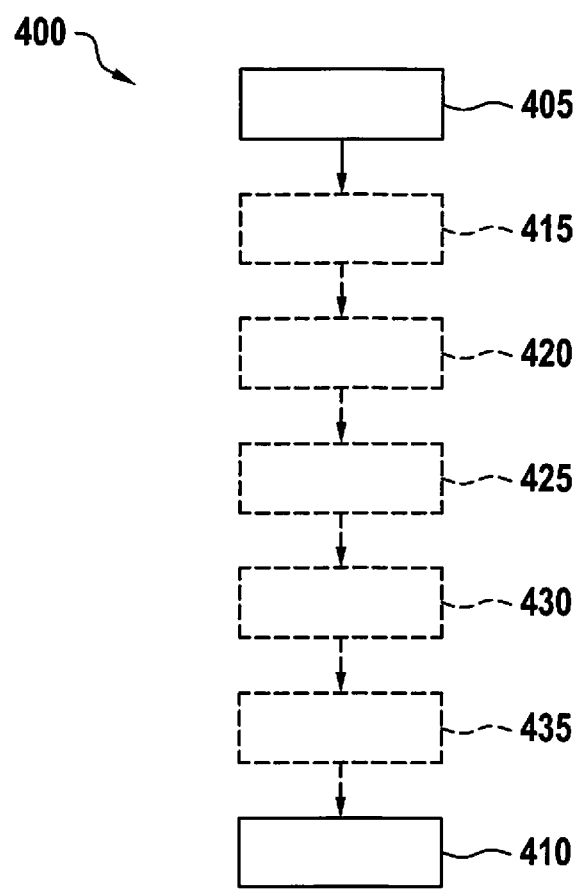
FIG. 4 shows a flow chart of a method for calibrating a camera of a vehicle according to one exemplary embodiment.

FIG. 4 shows a flow chart of a method 400 for calibrating a camera of a vehicle according to one exemplary embodiment. This may be a method 400 which is executable by the device described based on FIG. 3.

Method 400 includes at least one step 405 of reading in and one step 410 of setting. In step 405 of reading in, at least one first camera image and one second camera image are read in, which represent images recorded by at least the vehicle camera during a camera movement of the vehicle camera at a standstill of the vehicle. In step 410 of setting, a calibration parameter for calibrating at least the vehicle camera is set, using the first camera image and the second camera image.

The configurations of method 400 described hereafter are optional:

According to this exemplary embodiment, in step 405 of reading in, a multitude of camera images are read in, which represent images recorded by the vehicle camera situated in the area of an exterior mirror and/or a vehicle door and/or a tailgate of the vehicle.

According to this exemplary embodiment, in step 405 of reading in, the camera movement is read in via the multitude of the images, which represents a displacement path of at least the vehicle camera caused by folding in and/or folding out the exterior mirror of the vehicle and/or by opening and/or closing the vehicle door and/or by opening and/or closing the tailgate of the vehicle.

According to this exemplary embodiment, step 410 of setting is carried out since a vehicle movement signal is read in, which indicates the standstill of the vehicle.

Optionally, method 400 furthermore includes a step 415 of determining, a step 420 of receiving, a step 425 of ascertaining, a step 430 of comparing, and a step 435 of further receiving.

In step 415 of determining, a flux vector is determined using the first camera image and the second camera image, the calibration parameter being set using the flux vector in step 410 of setting. According to this exemplary embodiment, in step 415 of determining, the flux vector may be determined using a road surface spot depicted in the first camera image and the road surface spot depicted in the second camera image.

In step 420 of receiving, a predetermined reference vector is received. According to an alternative exemplary embodiment, method 400, in addition or as an alternative to step 420 of receiving, includes a step 425 of ascertaining, in which a displacement path representing the camera movement is ascertained, using an actuating signal of an adjusting motor for effectuating the camera movement.

In step 430 of comparing, the flux vector is compared to the reference vector, in step 410 of setting the calibration parameter being set, using a comparison result of step 430 of comparing.

In step 435 of further receiving, an inclination signal from an interface to an inclination sensor of the vehicle is received, step 410 of setting not being carried out when the inclination signal indicates an inclination of the vehicle.

The method steps introduced here may be carried out repeatedly and in a different order than the one described.

Figure 5:
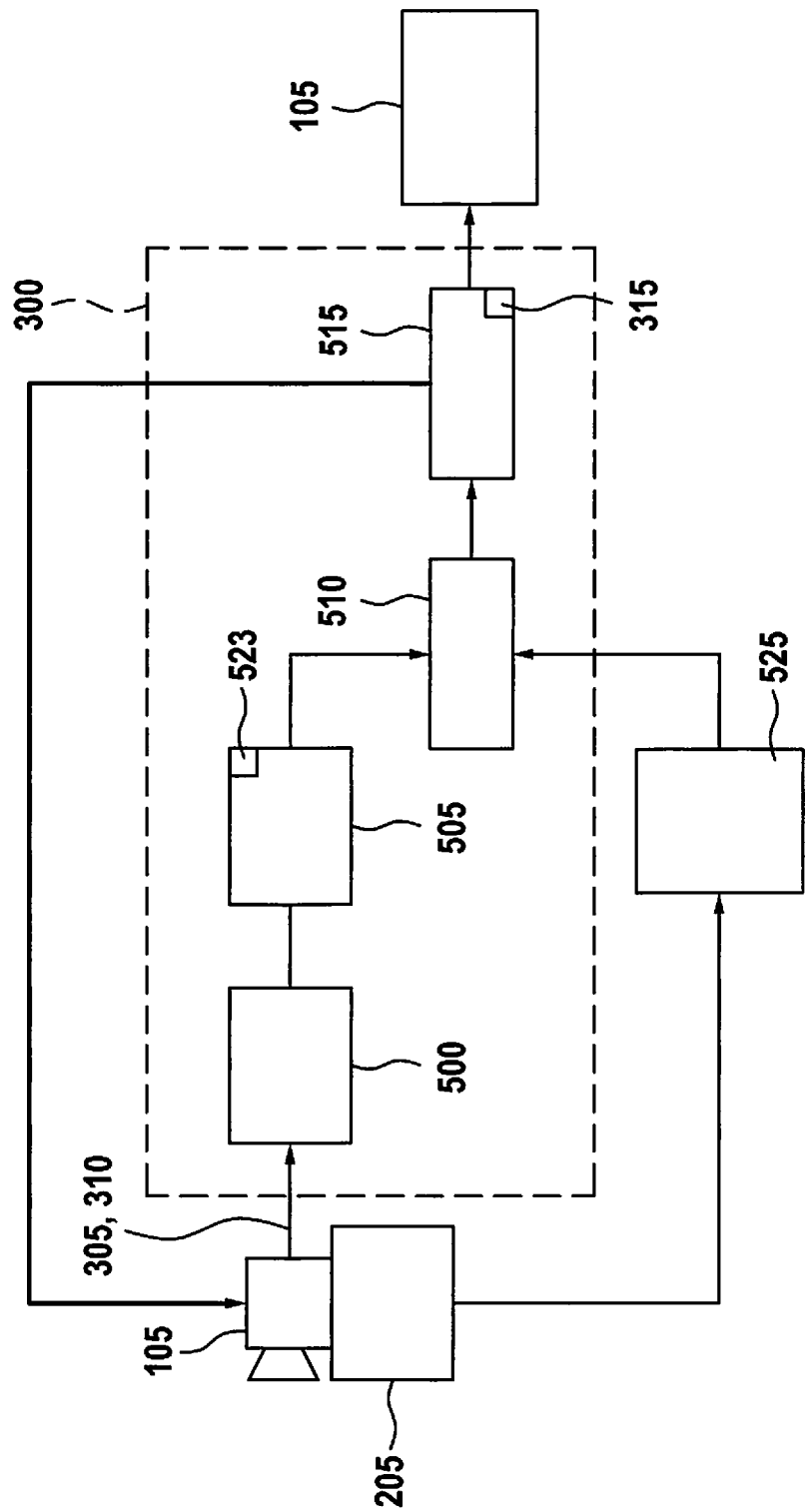
FIG. 5 shows a functional block diagram of a device for calibrating a camera of a vehicle according to one exemplary embodiment.

FIG. 5 shows a functional block diagram of a device 300 for calibrating a vehicle camera 105 of a vehicle according to one exemplary embodiment. This may be device 300 described in FIG. 3, which is configured to carry out the method described in FIG. 4. Vehicle camera 105 may be one of vehicle cameras 105 on the vehicle described based on one of the FIGS. 1 through 3.

According to this exemplary embodiment, device 300 includes a read-in unit 500, a determination unit 505, a comparison unit 510 and a setting unit 515.

According to this exemplary embodiment, vehicle camera 105 is situated on side door 205 of the vehicle and/or in an area of a motor of a mirror of the vehicle. Read-in unit 500 is configured to carry out an image transfer from vehicle camera 105, i.e., to read in at least first camera image 305 and second camera image 310, which represent images recorded during the camera movement of vehicle camera 105 at a standstill of the vehicle. Determination unit 505 is configured to determine flux vector 523, using at least first camera image 305 and second camera image 310, and according to this exemplary embodiment also to carry out a plane estimation. Comparison unit 510 is configured to receive predetermined reference vector 525, which represents a further flux vector or a flux image of the calibrated system in a memory. According to this exemplary embodiment, reference vector 525 has been ascertained using the known displacement path of side door 205, or according to the alternative exemplary embodiment using that of the mirror or of the tailgate. According to an alternative exemplary embodiment, reference vector 525 may also be stored in device 300. Furthermore, comparison unit 510 is configured to compare flux vector 523 to reference vector 525. Setting unit 515 is configured to set calibration parameter 315 for calibrating at least vehicle camera 105. According to this exemplary embodiment, setting unit 515 is configured to set calibration parameter 315, using a result of the comparison of comparison unit 510. According to this exemplary embodiment, setting unit 515 is configured to calibrate at least vehicle camera 105 and/or at least one further vehicle camera 105 of the vehicle by setting calibration parameter 315; this process may also be referred to as an algorithmic correction. The at least one vehicle camera 105 is thereupon extrinsically calibrated.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for calibrating a vehicle camera of a vehicle, the method comprising:
    reading in a first camera image and a second camera image, which represent images recorded by at least the vehicle camera during a camera movement of the vehicle camera at a standstill of the vehicle;
    setting a calibration parameter for calibrating at least the vehicle camera using the first camera image and the second camera image;
    determining an optical flux vector using the first camera image and the second camera image, in the task of setting, wherein the calibration parameter is set using the optical flux vector;
    receiving a predetermined reference vector; and
    comparing the optical flux vector to the reference vector;
    wherein in the setting, the calibration parameter is set using a comparison result of the comparing;
    wherein the predetermined reference vector is associated with the vehicle in an unloaded state;
    wherein the optical flux vector corresponds to the vehicle in a loaded state.

2. The method of claim 1, wherein in the determining, the optical flux vector is determined using a road surface spot depicted in the first camera image and the road surface spot depicted in the second camera image.

3. The method of claim 1, further comprising:
    ascertaining a displacement path representing the camera movement using an actuating signal of an adjusting motor for effectuating the camera movement.

4. The method of claim 1, wherein the setting is performed when a vehicle movement signal is read in, which indicates the standstill of the vehicle.

5. The method of claim 1, wherein in the reading in, camera images are read in which represent images recorded by the vehicle camera situated in the area of an exterior mirror, a vehicle door, and/or a tailgate of the vehicle.

6. The method of claim 1, wherein in the reading in, the camera movement represents a displacement path of at least the vehicle camera caused by folding in and/or folding out an exterior mirror of the vehicle, and/or by opening and/or closing a vehicle door, and/or by opening and/or closing a tailgate of the vehicle.

7. The method of claim 1, further comprising:
    receiving an inclination signal from an interface to an inclination sensor of the vehicle;
    wherein the setting is not performed when the inclination signal indicates an inclination of the vehicle.

8. A device, comprising:
    a processing unit that includes:
        a first arrangement for reading in a first camera image and a second camera image, which represent images recorded by at least the vehicle camera during a camera movement of the vehicle camera at a standstill of the vehicle;
        a second arrangement for setting a calibration parameter for calibrating at least the vehicle camera using the first camera image and the second camera image;
        a third arrangement for determining an optical flux vector using the first camera image and the second camera image, in the task of setting, wherein the calibration parameter is set using the optical flux vector;
        a fourth arrangement for receiving a predetermined reference vector; and
        a fifth arrangement for comparing the optical flux vector to the reference vector;
    wherein in the setting, the calibration parameter is set using a comparison result of the comparing;
    wherein the predetermined reference vector is associated with the vehicle in an unloaded state;
    wherein the optical flux vector corresponds to the vehicle in a loaded state.

9. A non-transitory computer readable medium having a computer program, which is executable by a processor, comprising:
    a program code arrangement having program code for for calibrating a vehicle camera of a vehicle, by performing the following:
        reading in a first camera image and a second camera image, which represent images recorded by at least the vehicle camera during a camera movement of the vehicle camera at a standstill of the vehicle;
        setting a calibration parameter for calibrating at least the vehicle camera using the first camera image and the second camera image;
        determining an optical flux vector using the first camera image and the second camera image, in the task of setting, wherein the calibration parameter is set using the optical flux vector;
        receiving a predetermined reference vector; and
        comparing the optical flux vector to the reference vector;
        wherein in the setting, the calibration parameter is set using a comparison result of the comparing;
        wherein the predetermined reference vector is associated with the vehicle in an unloaded state;

wherein the optical flux vector corresponds to the vehicle in a loaded state.

* * * * *